(12) United States Patent
Surnilla et al.

(10) Patent No.: US 9,453,470 B2
(45) Date of Patent: Sep. 27, 2016

(54) SYSTEM AND METHOD FOR ADJUSTING ENGINE AIRFLOW

(71) Applicant: Ford Global Technologies, LLC, Dearborn, MI (US)

(72) Inventors: Gopichandra Surnilla, West Bloomfield, MI (US); Mohannad Hakeem, Dearborn, MI (US); Timothy Joseph Clark, Livonia, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 14/577,203

(22) Filed: Dec. 19, 2014

(65) Prior Publication Data
US 2016/0177848 A1   Jun. 23, 2016

(51) Int. Cl.
F02D 41/00 (2006.01)
F02D 9/02 (2006.01)
F02D 35/00 (2006.01)
F02D 41/18 (2006.01)
F02D 41/02 (2006.01)

(52) U.S. Cl.
CPC ............. *F02D 41/0002* (2013.01); *F02D 9/02* (2013.01); *F02D 35/00* (2013.01); *F02D 41/021* (2013.01); *F02D 41/18* (2013.01); *F02D 2009/0225* (2013.01)

(58) Field of Classification Search
CPC .... F02D 41/0002; F02D 35/00; F02D 41/18; F02D 41/021
See application file for complete search history.

(56) References Cited

U.S. PATENT DOCUMENTS

| 6,062,204 | A | 5/2000 | Cullen |
| 7,104,228 | B2 | 9/2006 | Cullen |
| 7,246,604 | B2 | 7/2007 | Cullen |
| 2007/0051351 | A1 | 3/2007 | Pallett et al. |
| 2010/0236532 | A1* | 9/2010 | Xiao ............... F02D 41/146 123/677 |
| 2013/0268176 | A1* | 10/2013 | Song ............... F02M 35/10393 701/102 |

OTHER PUBLICATIONS

Surnilla, Gopichandra et al., "System and Method for Controlling Engine Air Flow," U.S. Appl. No. 14/577,378, filed Dec. 19, 2014, 30 pages.

* cited by examiner

*Primary Examiner* — Hung Q Nguyen
*Assistant Examiner* — Xiao Mo
(74) *Attorney, Agent, or Firm* — Julia Voutyras; Alleman Hall McCoy Russell & Tuttle LLP

(57) ABSTRACT

Methods and systems for operating an engine during conditions where ambient humidity changes over time are presented. In one non-limiting example, an engine airflow is adjusted to increase engine airflow during high humidity conditions such that an engine may provide equivalent torque output during the high humidity conditions as compared to when the engine is operated during low humidity conditions.

20 Claims, 6 Drawing Sheets

SYSTEM AND METHOD FOR ADJUSTING ENGINE AIRFLOW

BACKGROUND/SUMMARY

An amount of air entering an engine may be estimated via a manifold absolute pressure (MAP) sensor or a mass airflow (MAF) sensor. The MAP sensor has advantages of directly sampling intake manifold pressure to determine cylinder air charge. Consequently, the MAP sensor may provide more accurate engine airflow estimate when the engine intake manifold pressure is changing due to engine load transients. On the other hand, the MAF sensor provides an accurate measure of air mass entering the engine during steady state conditions which may improve engine air-fuel ratio control during steady state conditions. However, output of both the MAP sensor and MAF sensor may be affected by humidity in air since output of each sensor is not compensated for humidity. As a result, engine performance during humid conditions may not be as potent as engine performance during low humidity conditions.

The inventors herein have recognized the above-mentioned issues and have developed an engine operating method, comprising: adjusting spark timing advance/retard responsive to ambient humidity to reduce knock; adjusting engine airflow responsive to desired engine torque, the engine airflow adjusted responsive to a partial pressure of oxygen in air; and adjusting an estimated engine torque responsive to the partial pressure of oxygen in air in addition to the adjusted spark timing retard/advance, the partial pressure of oxygen in air based on ambient humidity.

By adjusting engine spark timing and desired engine airflow responsive to ambient air humidity; it may be possible to provide the technical result of an engine outputting an equivalent amount of torque output during high humidity conditions as the engine outputs during low humidity conditions. Adjusting the desired engine airflow responsive to the partial pressure of oxygen in air may allow the engine to operate with a same amount of oxygen during high ambient air humidity conditions as at low ambient humidity conditions. Consequently, the oxygen flowing through the engine may be matched with a suitable amount of fuel to increase engine torque during high humidity ambient conditions as compared to if the engine airflow is not adjusted for humidity. Further, if the engine control system includes a MAF sensor, the engine airflow may be adjusted responsive to a specific heat of the airflowing through the engine so that the engine operates with a same amount of oxygen during high ambient humidity conditions as at low ambient air humidity conditions. Additionally, spark timing adjustments for humidity may increase spark advance to improve engine torque during humid operating conditions.

The present description may provide several advantages. In particular, the approach may provide more uniform engine performance over a range of ambient air humidity levels. Further, the approach is suited for turbocharged and naturally aspirated engines. Further still, the approach may be applied to mass airflow systems and speed density systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
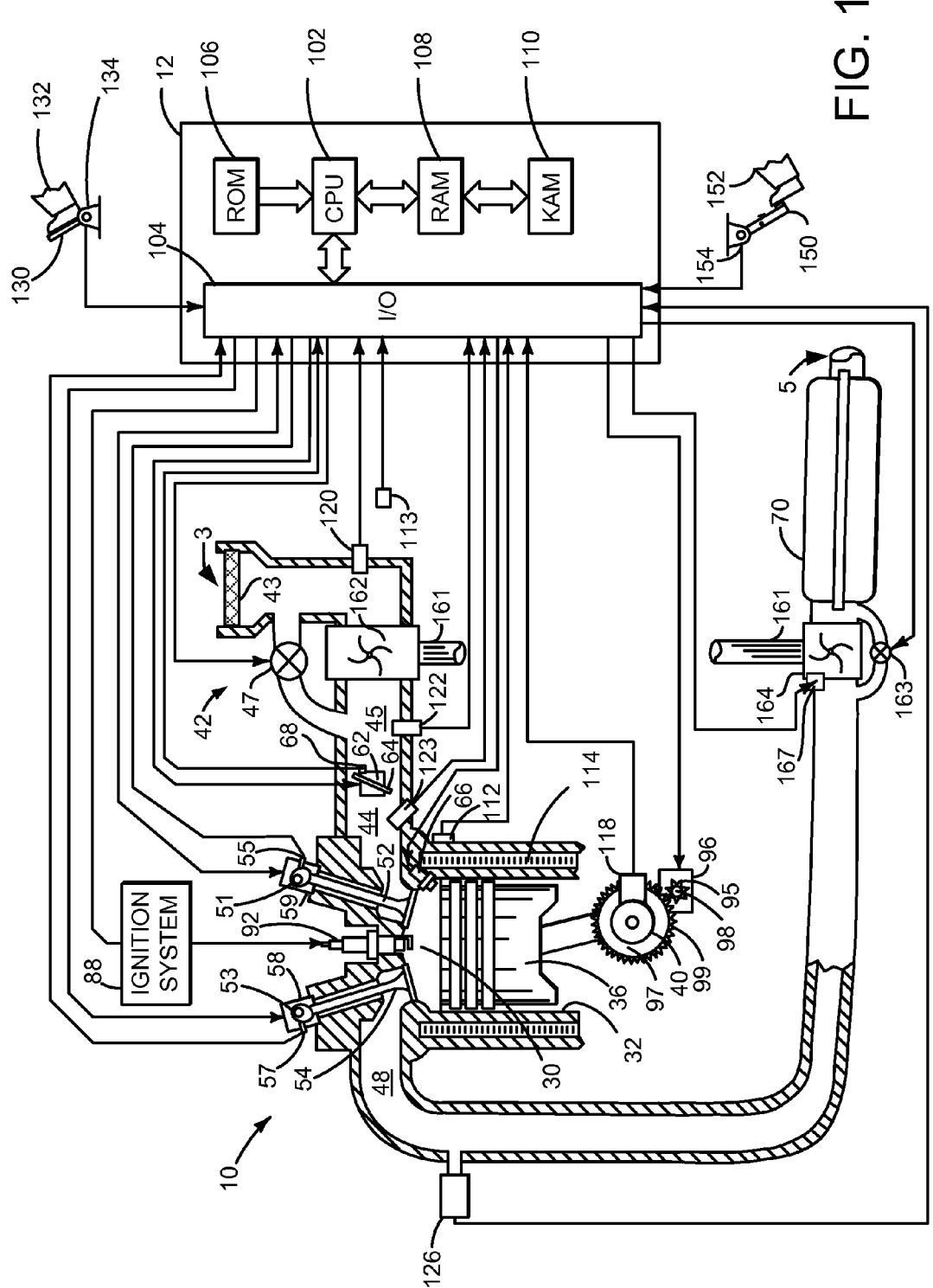
FIG. 1 shows a schematic depiction of an engine.
Figure 2:
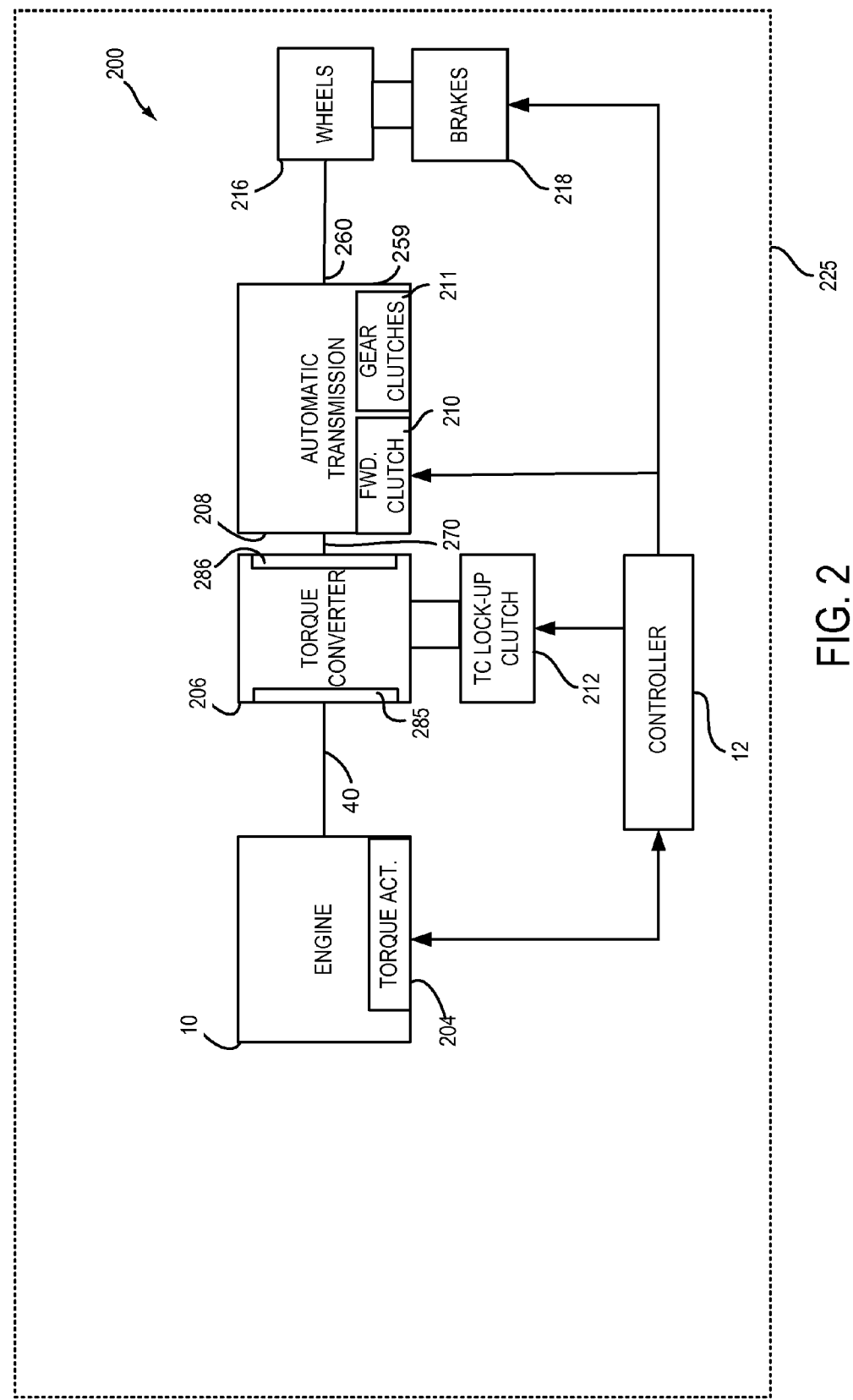
FIG. 2 shows a schematic depiction of the engine of FIG. 1 in a driveline.

The present description is related to operating an engine at varying ambient humidity levels. The engine may be configured as is shown in FIG. 1 in a driveline as is shown in FIG. 2. The engine of FIG. 1 may operate as is described in FIGS. 3-5. The system of FIG. 1 may include torque control as described by the block diagram of FIG. 6. The system of FIG. 1 may also include executable instructions to provide the engine operating method described in FIG. 7. The engine operating method of FIG. 7 modifies engine operation to improve engine torque output during low and high ambient humidity conditions. The engine may operate as is shown in the operating sequence of FIG. 8.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Phase of intake valve 52 with respect to crankshaft 40 may be adjusted via intake camshaft phaser 59. Phase of exhaust valve 54 with respect to crankshaft 40 may be adjusted via exhaust camshaft phaser 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control airflow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Alternatively, or in addition, vane actuator 167 adjusts a position of turbine vanes to increase or decrease turbine efficiency.

Air filter 43 cleans air entering engine air intake 42 via inlet 3 which is exposed to ambient temperature, pressure, and humidity. Converted combustion byproducts are exhausted at outlet 5 which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold absolute pressure (MAP) from pressure sensor 123 coupled to intake manifold 44; a measurement of engine boost pressure or throttle inlet pressure from pressure sensor 122; a measure of ambient air humidity from humidity sensor 113; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a driveline 200. The driveline of FIG. 2 includes engine 10 shown in FIG. 1. Driveline 200 may be powered by engine 10. Engine crankshaft 40 is shown coupled to torque converter 206. In particular, engine crankshaft 40 is mechanically coupled to torque converter impeller 285. Torque converter 206 also includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., reverse and gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and/or spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Figure 3:
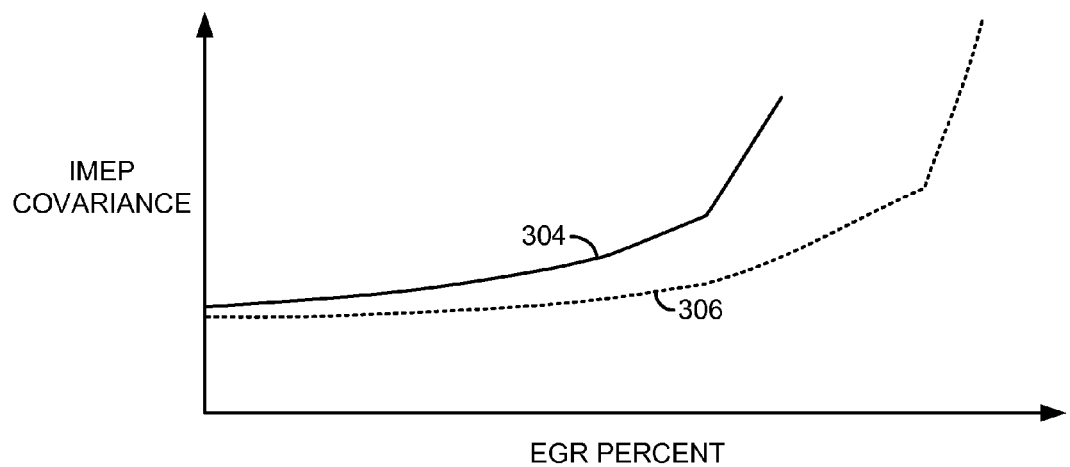
FIGS. 3-5 show example effects of humidity on internal combustion engine operation.

Referring now to FIG. 3, a plot showing variation of indicated mean effective pressure (IMEP) of engine cylinders versus exhaust gas recirculation (EGR) percentage is shown. The vertical axis represents IMEP covariance and IMEP covariance increases in the direction of the vertical axis arrow. The horizontal axis represents EGR percentage of cylinder charge of engine cylinders in percentage. The EGR percentage increases in the direction of the horizontal axis arrow.

Curve 304 represents IMEP covariance versus EGR percentage for an engine operating at a high ambient humidity level. Curve 306 represents IMEP covariance versus EGR percentage for the same engine operating at the same operating conditions, but at a lower ambient humidity level. As the IMEP covariance increases combustion stability in engine cylinders decreases and the possibility of engine misfire increases.

Thus, it may be observed that increasing humidity decreases combustion stability. This is because the increasing humidity operates to increase cylinder charge dilution. Consequently, it may be desirable to operate the engine with a lower EGR percentage when the engine is operating at higher ambient humidity levels for a given engine speed and load. Similarly, it may be desirable to operate the engine with a high EGR percentage when the engine is operating at lower ambient humidity levels at the same speed and load.

Figure 4:
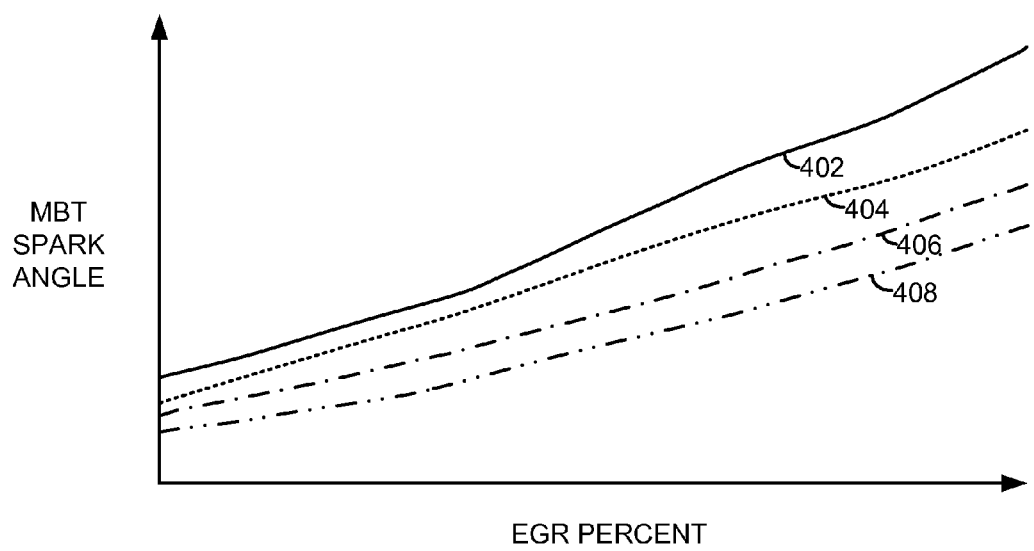

Referring now to FIG. 4, a plot showing minimum spark for best torque (MBT) (e.g., least spark advance for best torque) at a particular engine airflow rate versus exhaust gas recirculation (EGR) percentage is shown. The vertical axis represents MBT spark angle (e.g. crankshaft angle) and MBT spark angle increases in the direction of the vertical axis arrow. In other words, MBT spark timing advances in the direction of the vertical axis arrow. The horizontal axis represents EGR percentage of cylinder charge of engine cylinders in percentage. The EGR percentage increases in the direction of the horizontal axis arrow.

Curve 402 represents MBT spark angle versus EGR percentage for an engine operating at 80 percent relative ambient humidity level. Curve 404 represents MBT spark angle versus EGR percentage for the same engine operating at the same operating conditions and at 60 percent relative ambient humidity level. Curve 406 represents MBT spark angle versus EGR percentage for the same engine operating at the same operating conditions and at 40 percent relative ambient humidity level. Curve 408 represents MBT spark angle versus EGR percentage for the same engine operating at the same operating conditions and at 20 percent relative ambient humidity level.

Thus, it may be observed that increasing humidity increases the advance of MBT spark timing. This is because the increasing humidity operates to increase cylinder charge dilution. Therefore, it may be desirable to operate the engine with more advanced spark timing when the engine is operating at higher ambient humidity levels for a given engine speed and load. Similarly, it may be desirable to operate the engine with less advanced spark timing when the engine is operating at lower ambient humidity levels at the same speed and load. By adjusting MBT spark timing based on ambient humidity, it may be possible for the engine to provide a same amount of torque during high ambient humidity levels as the engine provides during low ambient humidity levels.

Figure 5:
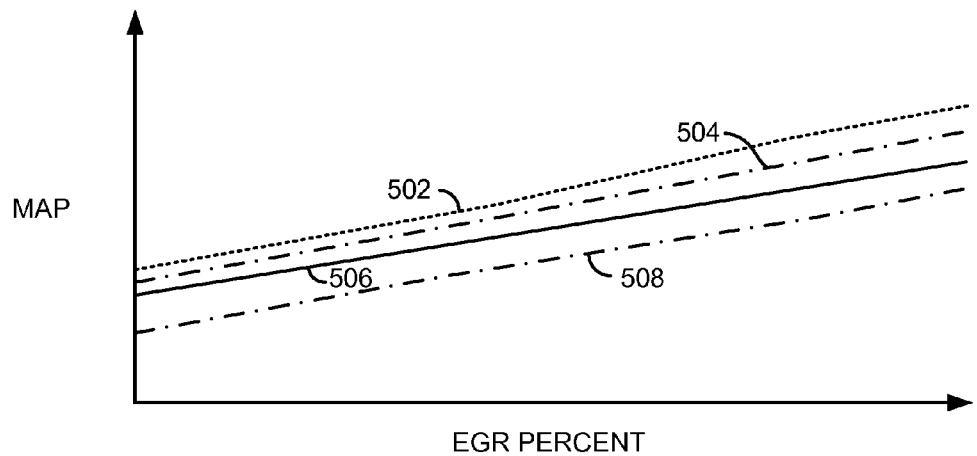

Referring now to FIG. 5, a plot showing intake manifold absolute pressure (MAP) versus exhaust gas recirculation (EGR) percentage for a given engine speed is shown. The vertical axis represents MAP and MAP increases in the direction of the vertical axis arrow. The horizontal axis represents EGR percentage of cylinder charge of engine cylinders in percentage. The EGR percentage increases in the direction of the horizontal axis arrow. The engine is operated to provide equivalent torque at each EGR percentage for the different ambient humidity levels.

Curve 502 represents MAP versus EGR percentage for an engine operating at 80 percent relative ambient humidity level. Curve 504 represents MAP versus EGR percentage for the same engine operating at the same operating conditions and at 60 percent relative ambient humidity level. Curve 506 represents MAP versus EGR percentage for the same engine operating at the same operating conditions and at 40 percent relative ambient humidity level. Curve 508 represents MAP versus EGR percentage for the same engine operating at the same operating conditions and at 20 percent relative ambient humidity level.

Accordingly, it may be observed that MAP has to increase to provide equivalent engine torque for a given engine speed and EGR percentage. This is because the MAP sensor does not compensate for the partial pressure of oxygen in the humid air. MAP may be increased at higher ambient humidity levels to provide the engine with an equivalent amount of oxygen as the engine receives during similar operating condition at lower ambient humidity levels. Therefore, it may be desirable to operate the engine at a higher MAP value when the engine is operating at higher ambient humidity levels for a given engine speed and load to provide a similar engine output torque as is produced by the engine at lower ambient humidity levels.

Figure 6:
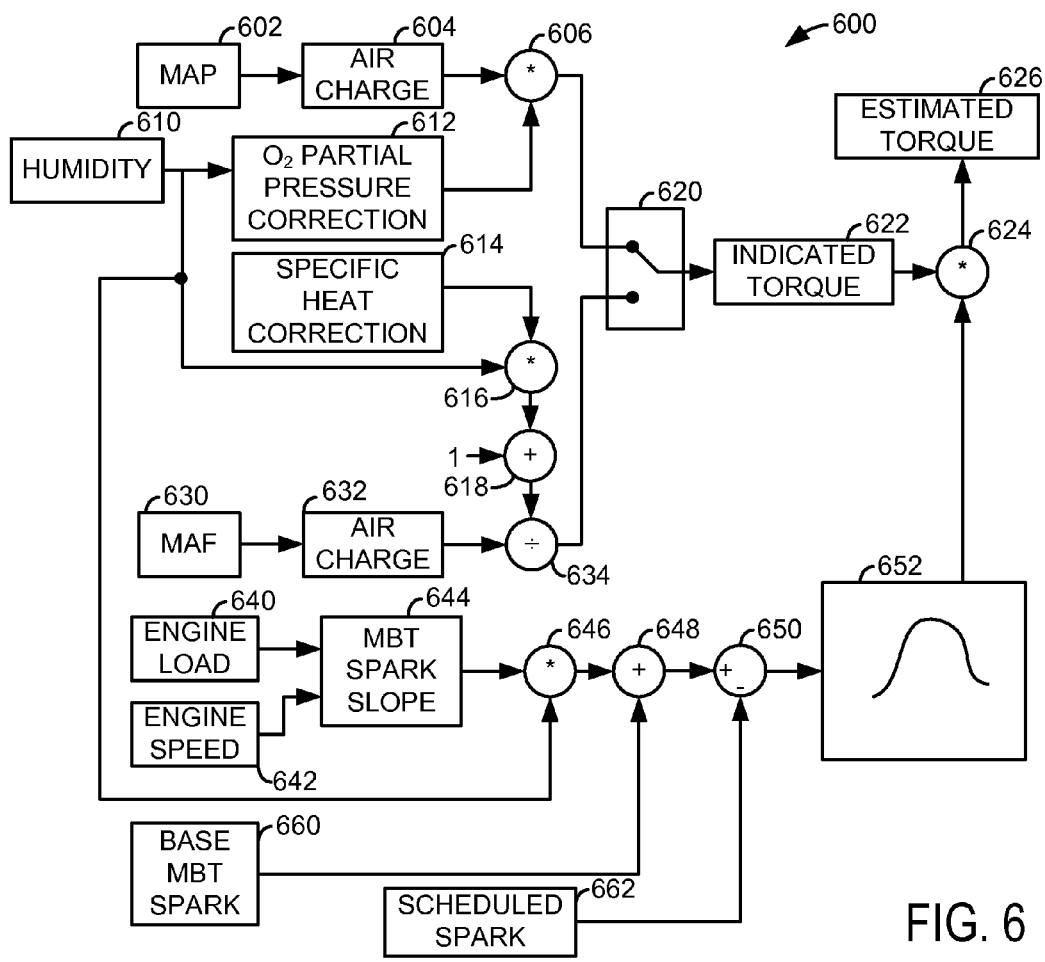
FIG. 6 shows a block diagram of an example engine torque control system.

Referring now to FIG. 6, a block diagram for estimating engine torque is shown. The block diagram of FIG. 6 may be incorporated into the system of FIG. 1 as executable instructions stored in non-transitory memory.

Manifold absolute pressure (MAP) enters block diagram 600 at 602. MAP may be sensed via a pressure sensor positioned exposed to engine intake manifold pressure. Cylinder air charge is determined from MAP at block 604. In one example, method 600 determined cylinder air charge from engine speed, air density, and MAP based on the following equation:

$$Mcyl = \alpha_1(N)Pm - \alpha_2(N)\frac{Pamb}{Pamb\_nom}$$

where Mcyl is mass of air in a cylinder, $\alpha_1$ and $\alpha_2$ are engine pumping parameters regressed from engine operating data (e.g., engine speed, MAP, and cylinder air mass) at ambient conditions and the present engine speed and load, N is engine speed, Pm is intake manifold pressure, Pamb is ambient pressure, Pamb_nom is nominal ambient pressure (e.g., 101 kPa). The engine air mass flow may be determined by multiplying the air in a cylinder by the number of engine cylinders divided by two, multiplied by engine speed. Alternatively, engine airflow may be determined via the ideal gas law and engine speed. The engine air mass flow is output to multiplication junction 606.

Engine mass airflow (MAF) enters block diagram 600 at 630. MAF may be sensed via a mass airflow sensor positioned in the engine air intake. The MAF sensor outputs an air mass flow rate for dry conditions to air charge block 632. The engine air mass flow rate during an engine revolution may be divided by a number of cylinders inducting air during the cylinder revolution to determine a cylinder air mass flow rate at 632. Alternatively, the engine air mass flow output from the MAF sensor may be integrated over two engine revolution to determine a mass of air inducted over an engine cycle, and the air mass inducted over the engine cycle may be divided by the number of engine cylinders to determine mass of air in a cylinder during an engine cycle at 632. The mass of air in an engine cylinder may be multiplied by engine speed and divided by two to determine cylinder mass flow rate.

For engines that operate under transient conditions, the engine mass airflow may be determined from a cylinder airflow expressed by the equation:

$$Ma = K \cdot F + [(K/Ko) \cdot (1-K) \cdot Mao]$$

where Ma is the inferred cylinder mass flow, K is a current filling coefficient, Ko is a previous filling coefficient, F is air mass flow rate into the engine, and Mao is previous cylinder mass flow, as described in U.S. Pat. No. 5,331,936 which is hereby fully incorporated for all intents and purposes. The cylinder mass flow may be converted into engine mass flow by multiplying the cylinder mass flow rate during an engine cycle (e.g., two revolutions) by a number of cylinders inducting air during the engine revolution. The engine air mass flow is output to division junction 634.

Humidity enters block diagram 600 at 610. Ambient humidity may be sensed via a sensor. The humidity sensor output is input into an empirically determined transfer function that outputs a molar percent humidity for air entering the engine. The molar percent humidity may be expressed as:

$$Mw = \frac{nw}{na + mw}$$

where Mw is the mole fraction of water vapor in air inducted to the engine, nw is the number of moles of water vapor in air inducted to the engine, and na is the number of moles of air inducted to the engine. Molar percent humidity of air entering the engine is output to oxygen partial pressure correction block 612, multiplication junction 616, and multiplication junction 646. Oxygen partial pressure correction block 612 is the basis for adjusting engine airflow as determined from MAP. Specific heat correction block 614 is the basis for adjusting engine airflow as determined from MAF.

At oxygen partial pressure block 612, the molar percent humidity is the basis for determining a humidity adjustment factor:

$$Hadj = \frac{1}{1 + \frac{Mol\_pct}{100}}$$

where Hadj is a humidity adjustment factor and Mol_pct is the molar percent humidity of air inducted to the engine. The humidity adjustment factor is output from block 612 to multiplication junction 606. The engine airflow from 604 is multiplied by the humidity adjustment factor at multiplication junction 606 to provide an engine airflow adjusted for humidity. The engine airflow adjusted for humidity is directed to switching block 620 from multiplication junction 606.

Specific heat correction block 614 outputs a heat capacity factor having a value of 1.82 to multiplication junction 616. The heat capacity factor is based on a ratio of specific heat of water (e.g., specific heat at constant pressure (Cp) for water) to specific heat of air (e.g., specific heat a constant pressure (Cp) for dry air).

At multiplication junction 616, the heat capacity factor is divided by 100 and multiplied by the molar percent humidity determined at 610. The result is added to a value of one at summing junction 618. The output of summing junction 618 routed to division junction 634 where engine airflow from 632 is divided by the output of summing junction 618 to provide an engine airflow adjusted for humidity. The engine airflow adjusted for humidity is directed to switching block 620.

Thus, according to the method described by block diagram 600 when engine airflow determined by a MAP sensor that is not humidity compensated is 100 g/min and ambient air humidity is three molar percent greater than nominal ambient humidity, the engine air amount compensated for humidity is: (100 g/min)*(1/(1+3/100))=97.09 g/min. For a MAF sensor based system 100 g/min engine airflow sensed by the MAF sensor at ambient air humidity three molar percent greater than nominal ambient air humidity, the engine air amount compensated for humidity is: (100 g/min)*(1/(1+(3*1.82)/100))=94.82 g/min.

At switching block 620, MAP or MAF based engine airflow is selected as the basis for determining indicated engine torque. Switching block 620 may select MAP based engine airflow or MAP based engine airflow based on engine operating conditions or based on the engine hardware configuration. In one example, block diagram 600 may select MAF based engine airflow in response to the engine operating at steady state conditions. MAP based engine airflow may be selected in response to the engine operating during transient conditions (e.g., varying engine speed and load). MAP or MAF based engine airflow is directed to engine indicated torque block 622.

At block 622, method 600 determines engine torque based on the engine airflow and the present engine speed. In one example, tables and/or functions that output empirically determined values of indicated engine torque are indexed via engine airflow and present engine speed. Indicated engine torque is output from block 622 to multiplication junction 624.

Engine load is input to block diagram 600 at 640. In one example, engine load may be determined by dividing the present mass of air entering a cylinder by the theoretical mass of air that may occupy the cylinder's full volume (e.g., when the cylinder's piston is at bottom dead center intake stroke) at standard atmospheric conditions. Engine load is directed to block 644.

Engine speed enters block diagram 600 at 642. Engine speed may be determined via an engine position sensor or via an analog tachometer. Engine speed is directed to block 644.

At block 644, method 600 determines a change in minimum spark timing for best torque (MBT) for each percent change in percent recirculated exhaust gas in the cylinder or percent molar humidity in the cylinder. Block 644 interpolates between empirically determined values in a table or function that are indexed via engine speed and load. Block 644 outputs a change in MBT spark timing per percent of EGR or molar humidity to multiplication junction 646.

The molar percent humidity determined at 610 is multiplied by the change in MBT spark timing per percent molar humidity to provide a change in MBT spark timing corrected for humidity, which is directed to summing junction 648.

A base MBT spark timing based on engine speed and load from block 660 is added to the change in MBT spark timing corrected for humidity at summing junction 648. The resulting MBT spark timing adjusted for humidity is supplied to summing junction 650.

Scheduled spark timing from block 662 is subtracted from MBT spark timing adjusted for humidity at summing junction 650. The result is a difference in spark timing from MBT humidity adjusted spark timing. The scheduled spark timing may be a combination of borderline knock spark timing and other spark timing adjustments (e.g., spark timing adjustments for fuel type). The difference in spark timing from MBT humidity adjusted spark timing is supplied to block 652.

Block 652 is a table or function that is indexed by spark timing from MBT humidity adjusted spark timing. The table or function includes empirically determined values of torque for spark timings retarded from MBT spark timing divided by torque for MBT spark timing (e.g., a torque ratio). The table outputs values that range from 0 to 1 (MBT spark timing). The output of block 652 is directed to multiplication block 624 where indicted engine torque is multiplied by the spark ratio or output of block 652. The resulting torque value at block 626 is estimated engine torque. Estimated engine torque may be the basis for shifting a transmission and restraining engine torque to less than a threshold torque to limit the possibility of engine degradation. For example, estimated engine torque may be input into a transmission shifting schedule that determines when transmission gears are shifted. In one example, the transmission may shift from first gear to second gear when engine torque is greater than 30 N-m and vehicle speed is greater than 10 KPH. Additionally, the estimate engine torque may be a basis for restricting or limiting airflow to reduce the possibility of engine degradation. For example, the engine throttle opening amount may not open more than a threshold opening amount if estimated engine torque is greater than or equal to a threshold torque. Likewise, camshaft advance may not be advanced more than a threshold amount if estimated engine torque is greater than a threshold.

Thus, engine airflow and spark timing may be adjusted responsive to ambient humidity. The adjustments may be based on the partial pressure of oxygen in air for MAP based engine airflow estimates. Similarly, adjustments may be based on specific heat of air drawn into the engine for MAF based engine airflow estimates.

Figure 7:
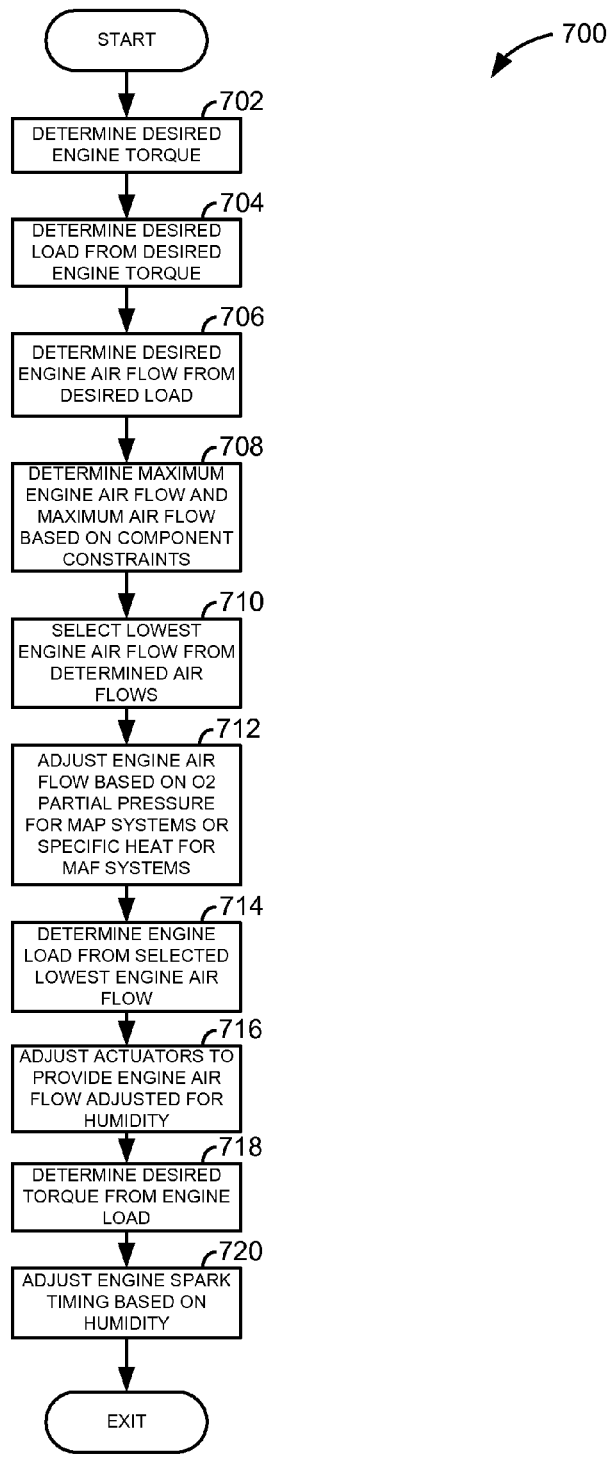
FIG. 7 shows a flowchart of an example method for operating an engine.
Figure 8:
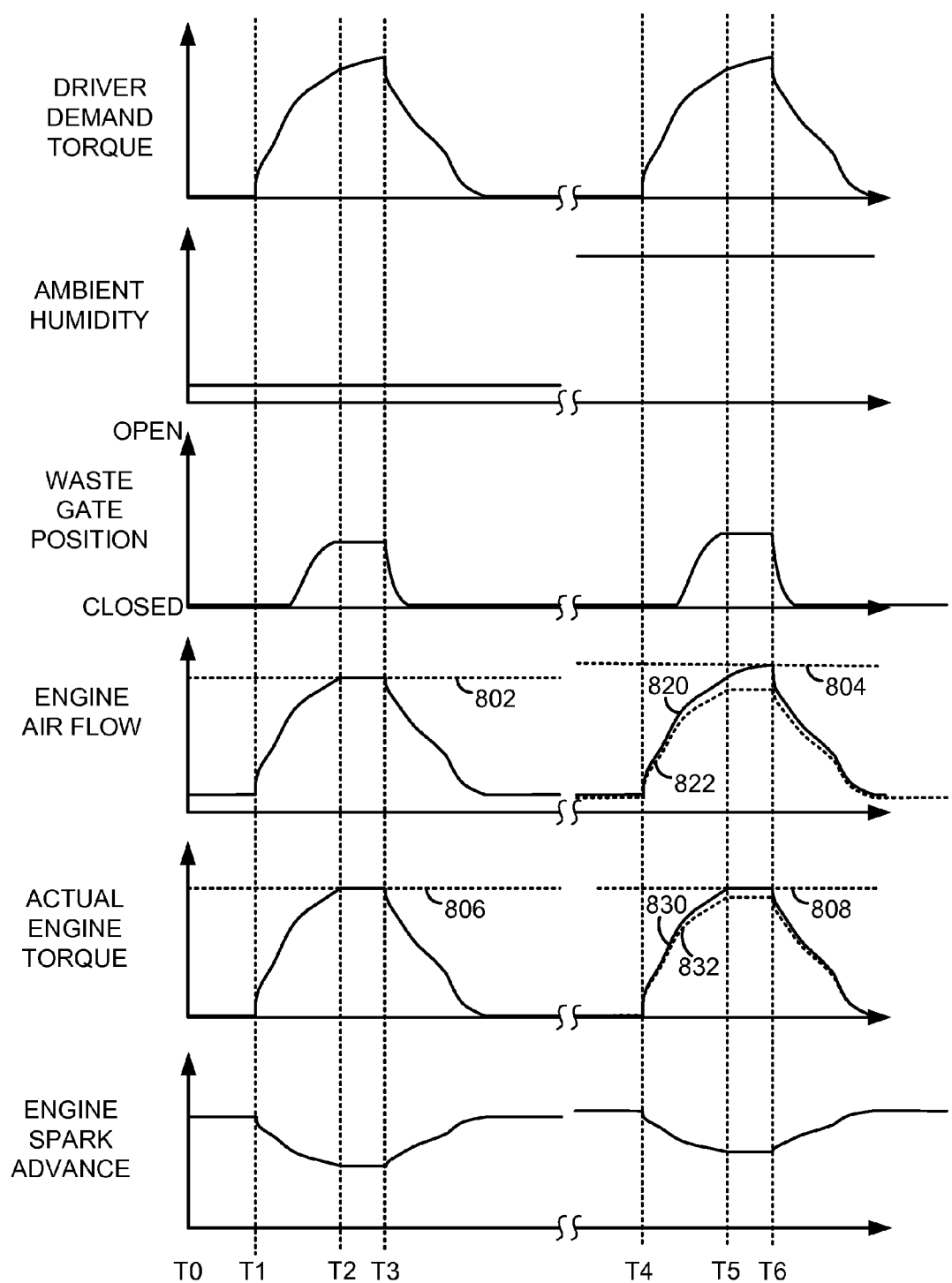
FIG. 8 shows an example engine operating sequence according to the method of FIG. 7.

Referring now to FIG. 7, a method for operating a vehicle driveline is shown. The method of FIG. 7 may be incorporated into the system of FIG. 1 as executable instructions stored in non-transitory memory. Further, the method of FIG. 7 may provide the operating sequence as is shown in FIG. 8.

At 702, method 700 determines a desired engine torque. The desired engine torque may be a sum of driver demand torque, accessory torque, and engine pumping torque. In one example, engine pumping torque may be empirically determined and stored to tables or functions in memory. Accessory torque is torque to operate the vehicle's alternator, air conditioning compressor, power steering pump, and other such devices. The accessory torque may also be empirically determined and stored to memory based on accessory speed and the load being driven. The driver demand torque may be determined based on vehicle speed and accelerator pedal position. Method 700 sums the driver demand torque, accessory torques, and engine pumping torque to provide a desired engine torque and method 700 proceeds to 704.

At 704, method 700 determines a desired engine load from the desired engine torque. The desired engine load may vary from near zero to a value greater than one for a turbocharged or supercharged engine. An engine load value of one for a non-turbocharged engine may represent full engine load at the engine's present speed. The engine load may be determined via a set of empirically determined tables or functions that output an engine load value depending on engine speed, engine valve timing, and engine operating mode (e.g., fuel economy, emissions, engine warming, etc.). In one example, a load value of one represents a maximum theoretical cylinder air charge in the cylinder at the particular speed the engine is operating when cylinder pressure is standard atmospheric pressure when cylinder volume is at a maximum (e.g., bottom dead center intake stroke). Method 700 proceeds to 706 after the engine load value is determined.

At 706, method 700 determines desired engine air mass flow from desired engine load. In one example, the desired engine airflow may be determined by multiplying the desired engine load by the theoretical maximum engine airflow at standard temperature and pressure (e.g., standard atmospheric pressure) multiplied by barometric pressure and ambient temperature adjustments for present engine operating conditions. The theoretical maximum engine airflow at standard temperature and pressure for a four stroke engine is the volume of engine cylinders divided by 2, multiplied by the engine speed. The desired engine air mass flow is the desired engine airflow multiplied by the density of air. Method 700 proceeds to 708 after determining the desired engine air mass flow.

At 708, method 700 determines a maximum engine airflow threshold and maximum engine airflow based on component thresholds. In one example, the maximum engine airflow threshold is based on a maximum engine torque determined from a maximum IMEP that is based on piston degradation. The maximum engine airflow threshold may be adjusted for ambient humidity as indicated in the equation:

$$\frac{\text{air\_maf\_max}}{1 - (\text{hum\_meas\_} - \text{hum\_base})}$$

where air_maf_max is the maximum engine airflow threshold, hum_meas is the measured humidity in molar percent, and hum_base is the base humidity in molar percent. The maximum engine airflow threshold may be empirically determined and stored to memory.

Method 700 also determines engine airflow limits or thresholds based on selected engine components. For example, method 700 determines maximum engine airflow or threshold for fuel injectors, turbocharger, and exhaust manifold temperature. Engine airflow limits for fuel injectors, turbocharger, and exhaust manifold temperature may be empirically determined and stored to controller memory. The engine airflow limit for fuel injectors is based on a maximum engine airflow when fuel injectors are flowing at a maximum rate. The engine airflow limit for the turbocharger is the maximum engine airflow when air is flowing through a turbocharger at the turbocharger's maximum airflow. The engine airflow limit for the engine exhaust is the maximum engine airflow that provides engine exhaust temperature less than a threshold temperature. Method 700 proceeds to 710 after maximum engine airflow threshold and engine airflow thresholds based on engine components are determined.

At 710, method selects a lowest value from the desired engine airflow determined at 706, the maximum engine airflow threshold determined at 708, and the engine airflow thresholds based on engine components determined at 708. Thus, if the desired engine airflow determined at 706 is 200 g/min, the maximum engine airflow threshold is 230 g/min, the maximum engine airflow for fuel injectors is 245 g/min, the maximum engine airflow for the turbocharger is 235 g/min, and the maximum engine airflow for engine exhaust temperature is 233 g/min, method 700 selects 200 g/min as the lowest engine airflow. On the other hand, if the desired engine airflow determined at 706 is 250 g/min, the maximum engine airflow threshold is 230 g/min, the maximum engine airflow for fuel injectors is 245 g/min, the maximum engine airflow for the turbocharger is 235 g/min, and the maximum engine airflow for engine exhaust temperature is 233 g/min, method 700 selects 230 g/min as the lowest engine airflow. In this way, the maximum engine airflow threshold and the engine airflow thresholds based on engine components may prevent the selected engine airflow from exceeding the maximum engine airflow threshold and the engine airflow thresholds based on engine components. Method 700 proceeds to 712 after the lowest engine airflow value is determined.

At 712, method 700 adjusts desired engine airflow based on ambient air humidity. A particular indicated engine torque resulting from a desired engine torque may be based on an engine airflow rate determined via a MAF or a MAP sensor during nominal ambient air humidity levels. If the engine is operating at present conditions of increased ambient air humidity at the same engine airflow rate based on uncompensated MAF or MAP sensors, the engine output torque will be less than if the engine were operating at the same condition but at nominal humidity. Therefore, an engine airflow rate that provides the desired engine torque and that is based on engine airflow as determined from a MAF or MAP sensor, is adjusted for ambient air humidity.

For engine airflow rates that provide the desired engine torque and that are based on a MAP sensor, method 700 adjusts engine airflow based on the following equation:

$$\text{Eng\_air\_hum} = \text{base\_airflow} \cdot \left(1 + \frac{\text{humidity}}{100}\right)$$

where Eng_air_hum is the desired engine airflow compensated for humidity, base_airflow is engine airflow at nominal humidity to provide the desired engine torque, and humidity is the molar percent humidity in ambient air. The molar percent humidity adjusts the engine airflow for the partial pressure of oxygen in the humid air. Thus, if the base engine airflow is 100 g/min to provide a desired engine torque and ambient humidity is three molar percent greater than nominal humidity when the base engine airflow was determined, the desired engine airflow compensated for humidity is 100*(1+93/100)=103 g/min of humid airflow for the engine to provide the same engine torque as at nominal humidity.

For engine airflow rates that provide the desired engine torque and that are based on a MAF sensor, method 700 adjusts engine airflow based on the following equation:

$$\text{Eng\_air\_hum} = \text{base\_airflow} \cdot \left(1 + \frac{\text{humidity} \cdot \text{heat\_cap\_fact}}{100}\right)$$

where Eng_air_hum is the desired engine airflow compensated for humidity, base_airflow is engine airflow at nominal humidity to provide the desired engine torque, heat_cap_fact is the heat capacity factor described at 614 of FIG. 6, and humidity is the molar percent humidity in ambient air. The molar percent humidity and the heat capacity factor adjust the engine airflow for the heat capacity of the humid ambient air. Thus, if the base engine airflow is 100 g/min to provide a desired engine torque and ambient humidity is three molar percent greater than nominal humidity when the base engine airflow was determined, the desired engine airflow compensated for humidity is 100*(1+(3*1.82)/100))=105.46 g/min of humid airflow for the engine to provide the same engine torque as at nominal humidity. Method 700 proceeds to 714 after the desired engine air amount is compensated or adjusted for ambient air humidity.

At 714, method 700 determines engine load from the lowest engine airflow selected at 710. In one example, the tables and/or functions at 706 are inverted and the engine airflow from 710 is the basis for indexing the tables and/or functions. The tables and/or functions output engine load. Method 700 proceeds to 716 after engine load is determined.

At 716, method 700 adjusts engine actuators to provide the humidity adjusted engine airflow determined at 712. In one example, method 700 prevents a throttle opening amount, camshaft advance relative to crankshaft position, boost pressure, and/or waste gate closing amount from exceeding threshold amounts so that the humidity adjusted engine airflow is not exceeded. Thus, each of throttle opening amount, camshaft advance, boost pressure and waste gate closing amount may not exceed threshold values so that the humidity adjusted engine airflow is not exceeded. Further, the throttle position and camshaft positions that provide the desired engine airflow adjusted for humidity are determined by indexing empirically determined tables and functions that output throttle position and camshaft positions based on the desired engine airflow adjusted for humidity. Method 700 proceeds to 718 after operating engine actuators to provide the desired engine airflow compensated for humidity.

At 718, method 700 determines engine desired torque from the engine load determined at 714. Thus, the engine load is revised based on the engine airflow limits and the selected lowest In one example, the tables and/or functions at 704 are inverted so that the engine load from 714 is the basis for index tables and/or functions. The tables and/or functions output engine load. Because engine load and engine indicated torque are based on the lowest torque determined at 710, the engine load and indicated torque are maintained below a threshold engine load and threshold indicated torque. Method 700 proceeds to exit after engine load is determined.

At 720, method 700 adjusts engine spark timing in response to humidity. In one example, tables housing empirically determined spark timings are indexed via engine speed, engine load or airflow, and humidity. The tables output engine spark timing compensated for humidity. The spark timing advances as ambient humidity increases. Method 700 proceeds to 722 after spark timing is adjusted.

In this way, the maximum engine airflow threshold may be adjusted responsive to humidity. For example, the maximum engine airflow may be increased for higher ambient humidity levels so that an equivalent amount of oxygen is supplied to the engine during the same operating conditions, except for the engine operating at a lower ambient humidity level.

Thus, the method of FIG. 7 provides for an engine operating method, comprising: adjusting spark timing advance/retard responsive to ambient humidity to reduce knock; adjusting engine airflow responsive to desired engine torque, the engine airflow adjusted responsive to a partial pressure of oxygen in air; and adjusting an estimated engine torque responsive to the partial pressure of oxygen in air in addition to the adjusted spark timing retard/advance, the partial pressure of oxygen in air based on ambient humidity.

The method includes where the estimated engine torque is based on output of a MAP sensor. The method includes where the spark timing is adjusted base on a torque ratio of spark timing retarded from minimum spark timing for best engine torque divided by spark timing for best torque. The method includes where engine airflow is adjusted via a throttle. The method includes where engine airflow is adjusted via camshafts. The method includes where the spark timing advance/retard is adjusted based on a minimum spark for best torque slope. The method includes where desired engine torque is based on desired driver demand torque.

The method of FIG. 7 also provides for an engine operating method, comprising: generating a humidity value indicative of an ambient humidity level; generating an engine air mass flow value based on a partial pressure of oxygen in air, the partial pressure of oxygen in air based on the ambient humidity level; generating a base minimum spark timing for best torque; adjusting the base minimum spark timing for best torque based on the ambient humidity level; and estimating a torque generated by the engine responsive to the engine air mass flow and the adjusted base minimum spark angle. The method includes where the torque generated by the engine is based on measured engine airflow.

In some examples, the method includes where the measured engine airflow is based on output of a manifold absolute pressure sensor. The method includes where the measured engine airflow is based on output of a mass airflow sensor. The method include where the measured engine airflow is adjusted for a specific heat. The method includes where the specific heat is based on a ratio of specific heat of water to a specific heat of air. The method further comprises adjusting an engine airflow threshold responsive to the ambient humidity, and where the engine airflow threshold is a maximum engine airflow.

The method of FIG. 7 provide for an engine operating method, comprising: adjusting spark timing advance/retard responsive to ambient humidity to reduce knock; adjusting engine airflow responsive to desired engine torque, the engine airflow adjusted responsive to a heat capacity factor; and adjusting an estimated engine torque responsive to the heat capacity factor in addition to the adjusted spark timing retard/advance. The method includes where the heat capacity factor is a ratio of specific heat of water to specific heat of dry air. The method includes where the estimated engine torque is based on output of a mass air flow sensor. The method includes where the estimated engine torque is a basis for transmission gear shifting. The method includes where the estimated engine torque is a basis for restricting engine torque to less than a threshold torque. The method includes where the heat capacity factor is a value of 1.82.

Referring now to FIG. 8, an example simulated engine operating sequence is shown. The signals and sequences of FIG. 6 may be provided by the system shown in FIG. 1 executing the method of FIG. 6. Vertical markers T0-T6 represent times of interest in the sequence. In this example, the engine is shown operating at different ambient humidity levels according to the method of FIG. 7. The first portion of the engine operating sequence occurs between times T0 and T3. It represents engine operation during low ambient humidity conditions. The second portion of the engine operating sequence occurs between times T4 and T6. It represents engine operation during high ambient humidity conditions. The double S along the horizontal axis of each plot represents a brake in time. The time interval may be long or short between the double S time brake.

The first plot from the top of FIG. 8 represents driver demand torque versus time. The horizontal axis represents time and time increases from the left side of the plot to the right side of the plot. The vertical axis represents driver demand torque and driver demand torque increases in the direction of the vertical axis arrow. Driver demand torque may be determined from accelerator pedal position and vehicle speed.

The second plot from the top of FIG. 8 represents ambient humidity level speed versus time. The vertical axis represents ambient humidity level and ambient humidity level increases in the direction of the vertical axis arrow. The horizontal axis represents time and time increases from the left side of the plot to the right side of the plot.

The third plot from the top of FIG. 8 represents turbocharger waste gate position versus time. The vertical axis represents waste gate position and waste gate position opening amount increases in the direction of the vertical axis arrow. The horizontal axis represents time and time increases from the left to the right side of the figure.

The fourth plot from the top of FIG. 8 represents engine airflow amount versus time. The vertical axis represents engine airflow amount and engine airflow amount increases in the direction of the vertical axis arrow. The horizontal axis represents time and time increases from the left to the right side of the figure. Horizontal line 702 represents a maximum engine airflow threshold for low ambient humidity conditions at the present engine operating conditions. Horizontal line 804 represents a maximum engine airflow threshold for high ambient humidity conditions at the present engine operating conditions, the same operating conditions as for horizontal line 802, except higher ambient humidity. Solid line 820 represents engine airflow when the engine is operated according to the method of FIG. 7. Dashed line 822 represents engine airflow when the engine is not operated with corrections for humidity.

The fifth plot from the top of FIG. 8 represents engine indicated torque versus time. The vertical axis represents engine indicated torque application engine indicated torque increases in the direction of the vertical axis arrow. The horizontal axis represents time and time increases from the left to the right side of the figure. Horizontal line 806 represents a maximum engine indicated torque threshold for low ambient humidity conditions at the present engine operating conditions. Horizontal line 808 represents a maximum engine indicated torque threshold for high ambient humidity conditions at the present engine operating conditions, the same operating conditions as for horizontal line 706, except higher ambient humidity. Solid line 830 represents engine torque when the engine is operated according to the method of FIG. 7. Dashed line 832 represents engine torque when the engine is not operated with corrections for humidity.

The sixth plot from the top of FIG. 8 represents engine spark advance versus time. The vertical axis represents engine spark advance and engine spark advance increases in the direction of the vertical axis arrow. The horizontal axis represents time and time increases from the left to the right side of the figure.

At time T0, the driver demand torque is at a lower level and the ambient humidity level is low. At lower ambient humidity levels, MAP and MAF sensor outputs are less affected by humidity. The waste gate position is closed and the engine airflow is low. Such conditions may be indicative of engine idle conditions. Additionally, engine indicated torque is low and spark timing is advanced.

At time T1, a driver increases the driver demand torque and the engine airflow begins to increase in response to the increased driver demand torque. The ambient humidity level remains low and the waste gate remains closed as the engine begins to accelerate (not shown). The engine indicated torque increases in response to the increased driver demand torque and engine airflow. The spark advance is retarded as driver demand torque increases and engine speed increases (not shown).

Between time T1 and time T2, the driver demand torque continues to increase and the engine airflow and indicated torque increase with the increasing driver demand torque. The waste gate begins to open as engine speed increases and thermal energy supplied to the turbocharger increases (not shown). The engine spark timing is further retarded.

At time T2, the engine airflow is held or limited to the value of threshold 802 to reduce the possibility of engine degradation even though the driver demand torque continues to increase. The engine airflow may be limited to a maximum engine airflow as is described at 708 of FIG. 7. The engine airflow may be limited to the maximum engine airflow via limiting waste gate opening as is shown a time T2. Further, the engine throttle opening amount and cam advance may be limited or constrained to values that prevent engine airflow from exceeding threshold 802. By constraining engine airflow to less than a threshold, engine torque may be constrained to threshold 806. Spark timing is held constant as engine airflow is held to less than or equal to threshold 802.

Between time T2 and time T3, the driver demand torque continues to increase, but engine airflow, engine spark, and indicated engine torque remain unchanged. The ambient humidity level also remains at a constant low value.

At time T3, the driver releases the accelerator pedal (not shown) and the driver demand torque begins to decline. The engine airflow and indicated engine torque begin to be reduced shortly after the driver demand torque is reduced to less than a torque that requests airflow greater than level 802. The waste gate opening amount also decreases in response to the reduced driver demand torque. The spark advance increases in response to the decrease in driver demand torque.

The second part of the sequence starts just before time T4 where the engine is operated under the same operating conditions as at time T0, except the ambient humidity level has increased. The engine spark timing is advanced in response to the increase in humidity as described in FIG. 6 as compared to the spark timing at time T0. Further, the engine airflow amount is increased a small amount so that the engine inducts a same amount of oxygen as the engine inducts at time T0.

At time T4, a driver increases the driver demand torque and the engine airflow begins to increase in response to the increased driver demand torque the same as at time T1. The ambient humidity level remains high and the waste gate remains closed as the engine begins to accelerate (not shown). The engine indicated torque increases in response to the increased driver demand torque and engine airflow. The spark advance is retarded as driver demand torque increases and engine speed increases (not shown). The spark advance at time T4 is further advanced than the spark timing at time T1 to compensate for the dilution provided by the higher ambient humidity. The engine airflow and torque are also increased in response to ambient humidity as indicated by curves 820 and 830 as compared to engine airflow curve 822 and engine torque curve 832 when ambient air humidity compensation is not provided.

Between time T4 and time T5, the driver demand torque continues to increase and the indicated torque increases with the increasing driver demand torque the same as between time T1 and time T2 for indicated torque curve 820 which is compensated for ambient air humidity. Indicated torque curve 822 which is not compensated for ambient air humidity increases less than curve 820. The waste gate begins to open as engine speed increases and thermal energy supplied to the turbocharger increases (not shown). The engine spark timing is further advanced as compared to the spark timing shown between time T2 and time T3.

At time T5, the engine airflow indicated by curve 820 continues to rise because the engine airflow threshold has been increased to the value of threshold 804. The engine airflow curve 822 increases less than curve 820 at the engine airflow is not increased to greater than threshold 802 when ambient humidity compensation is not provided. The engine airflow threshold may be increased during higher ambient humidity conditions as shown by curve 820 so that the engine is supplied a same amount of oxygen as when the engine is operated at the same conditions, except at a lower ambient humidity level. The engine airflow curve 820 may be limited to a maximum engine airflow threshold as is described at 708 of FIG. 7. The engine airflow compensated for humidity (curve 820) may be limited to the maximum engine airflow threshold via limiting waste gate opening as is shown a time T5. Additionally, the engine throttle opening amount and cam advance may be limited or constrained to values that prevent engine airflow from exceeding threshold 804. By constraining engine airflow to less than a threshold, engine torque may be constrained to threshold 808, which is the same as threshold 806. Thus, engine airflow may be increased to compensate for MAP or MAF sensor outputs which may not adjust for ambient humidity. Spark timing is held constant as engine airflow is held to less than or equal to threshold 804.

Between time T5 and time T6, the driver demand torque continues to increase along with the engine airflow that is compensated for ambient air humidity (curve 820). The indicated engine torque is also adjusted for ambient humidity, the engine spark and indicated engine torque will change with increasing engine airflow. The ambient humidity level also remains at a constant high value.

At time T6, the driver releases the accelerator pedal (not shown) and the driver demand torque begins to decline. The ambient humidity compensated engine airflow and uncompensated engine airflow decrease as driver demand decreases. Additionally, the indicated humidity compensated engine torque and uncompensated indicated torque begin to be reduced as the driver demand torque is reduced. The waste gate opening amount also decreases in response to the reduced driver demand torque. The spark advance increases in response to the decrease in driver demand torque.

In this way, if the engine is operated at higher ambient humidity levels, the engine airflow threshold and engine airflow may be increased as compared to uncompensated engine airflow and engine airflow threshold so that an amount of oxygen supplied to the engine remains constant between humid and less humid operating conditions. Accordingly, the engine may provide same maximum torque output at the same operating conditions, including high and low humidity conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
adjusting spark timing advance/retard responsive to ambient humidity to reduce knock;
adjusting engine airflow responsive to desired engine torque, the engine airflow adjusted responsive to a partial pressure of oxygen in air; and
adjusting an estimated engine torque responsive to the partial pressure of oxygen in air in addition to the adjusted spark timing retard/advance, the partial pressure of oxygen in air based on ambient humidity.

2. The method of claim 1, where the estimated engine torque is based on output of a MAP sensor.

3. The method of claim 1, where the spark timing is adjusted base on a torque ratio of spark timing retarded from minimum spark timing for best engine torque divided by spark timing for best torque.

4. The method of claim 1, where engine airflow is adjusted via a throttle.

5. The method of claim 1, where engine airflow is adjusted via camshafts.

6. The method of claim 1, where the spark timing advance/retard is adjusted based on a minimum spark for best torque slope.

7. The method of claim 1, where desired engine torque is based on desired driver demand torque.

8. An engine operating method, comprising:
generating a humidity value indicative of an ambient humidity level;
generating an engine air mass flow value based on a partial pressure of oxygen in air, the partial pressure of oxygen in air based on the ambient humidity level;
generating a base minimum spark timing for best torque;
adjusting the base minimum spark timing for best torque based on the ambient humidity level; and
estimating a torque generated by the engine responsive to the engine air mass flow and the adjusted base minimum spark angle.

9. The method of claim 8, where the torque generated by the engine is based on measured engine airflow.

10. The method of claim 8, where the measured engine airflow is based on output of a manifold absolute pressure sensor.

11. The method of claim 8, where the measured engine airflow is based on output of a mass airflow sensor.

12. The method of claim 11, where the measured engine airflow is adjusted via a heat capacity factor.

13. The method of claim 12, where the heat capacity factor is based on a ratio of specific heat of water to a specific heat of air.

14. The method of claim 8, further comprising adjusting an engine airflow threshold responsive to the ambient humidity, and where the engine airflow threshold is a maximum engine airflow.

15. An engine operating method, comprising:
- adjusting spark timing advance/retard responsive to ambient humidity to reduce knock;
- adjusting engine airflow responsive to desired engine torque, the engine airflow adjusted responsive to a heat capacity factor; and
- adjusting an estimated engine torque responsive to the heat capacity factor in addition to the adjusted spark timing retard/advance.

16. The method of claim 15, where the heat capacity factor is a ratio of specific heat of water to specific heat of dry air.

17. The method of claim 15, where the estimated engine torque is based on output of a mass air flow sensor.

18. The method of claim 17, where the estimated engine torque is a basis for transmission gear shifting.

19. The method of claim 17, where the estimated engine torque is a basis for restricting engine torque to less than a threshold torque.

20. The method of claim 15, where the heat capacity factor is a value of 1.82.

* * * * *